No. 726,352. PATENTED APR. 28, 1903.
J. ROSEBUSH.
COMBINED MOP WRINGER AND SCRUBBING PAIL.
APPLICATION FILED APR. 14, 1902.
NO MODEL. 2 SHEETS—SHEET 1.

Witnesses.
H. D. Kilgord
A. H. Opsahl

Inventor,
John Rosebush,
By his Attorneys,
Williamson & Merchant

No. 726,352. PATENTED APR. 28, 1903.
J. ROSEBUSH.
COMBINED MOP WRINGER AND SCRUBBING PAIL.
APPLICATION FILED APR. 14, 1902.
NO MODEL. 2 SHEETS—SHEET 2.
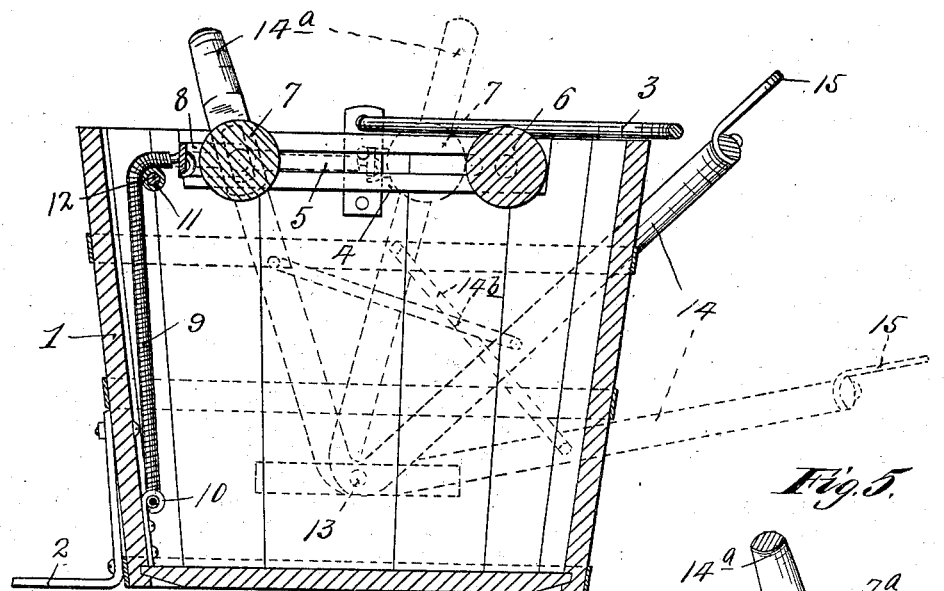
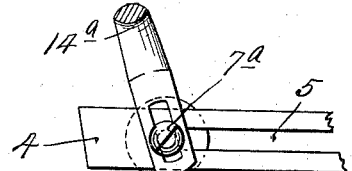
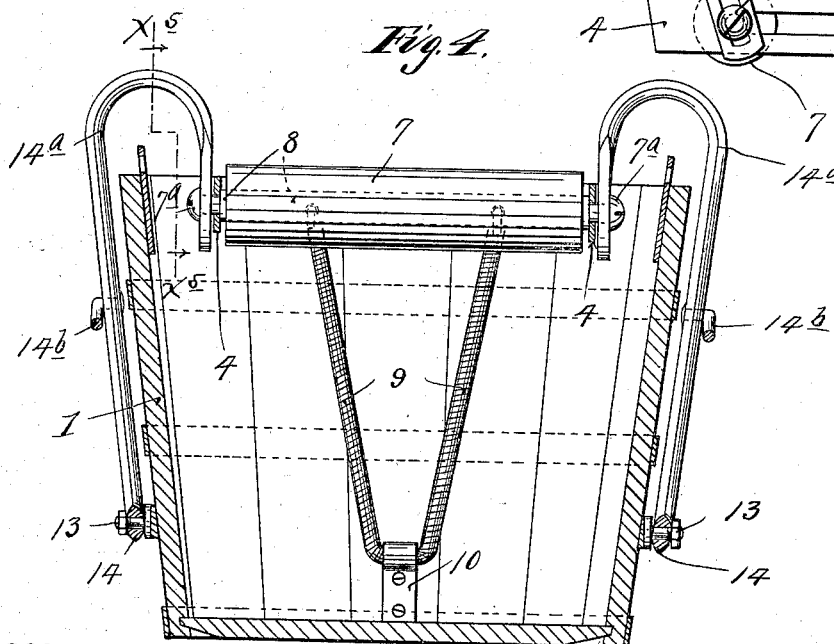
Witnesses.
H. D. Kyyn
A. H. Opsahl.
Inventor:
John Rosebush,
By his Attorneys,
Williamson & Merchant

UNITED STATES PATENT OFFICE.

JOHN ROSEBUSH, OF MINNEAPOLIS, MINNESOTA, ASSIGNOR OF ONE-THIRD TO W. D. WILLIAMS, OF MINNEAPOLIS, MINNESOTA.

COMBINED MOP-WRINGER AND SCRUBBING-PAIL.

SPECIFICATION forming part of Letters Patent No. 726,352, dated April 28, 1903.

Application filed April 14, 1902. Serial No. 102,750. (No model.)

*To all whom it may concern:*

Be it known that I, JOHN ROSEBUSH, a citizen of the United States, residing at Minneapolis, in the county of Hennepin and State of Minnesota, have invented certain new and useful Improvements in Mop-Wringers; and I do hereby declare the following to be a full, clear, and exact description of the invention, such as will enable others skilled in the art to which it appertains to make and use the same.

My invention has for its object to provide an improved scrubbing-pail with wringer attachment; and to this end it consists of the novel devices and combinations of devices hereinafter described, and defined in the claims.

The invention is illustrated in the accompanying drawings, wherein like characters indicate like parts throughout the several views.

Figure 1:
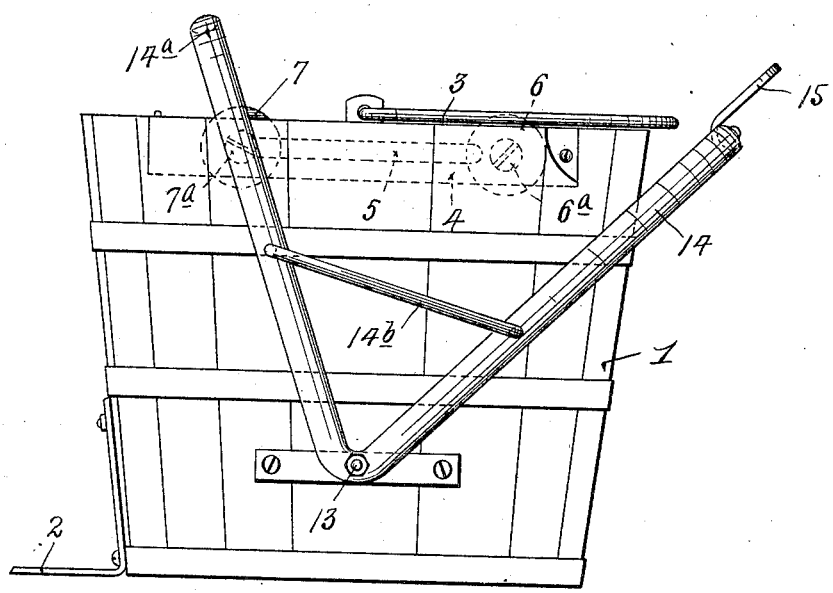
Figure 2:
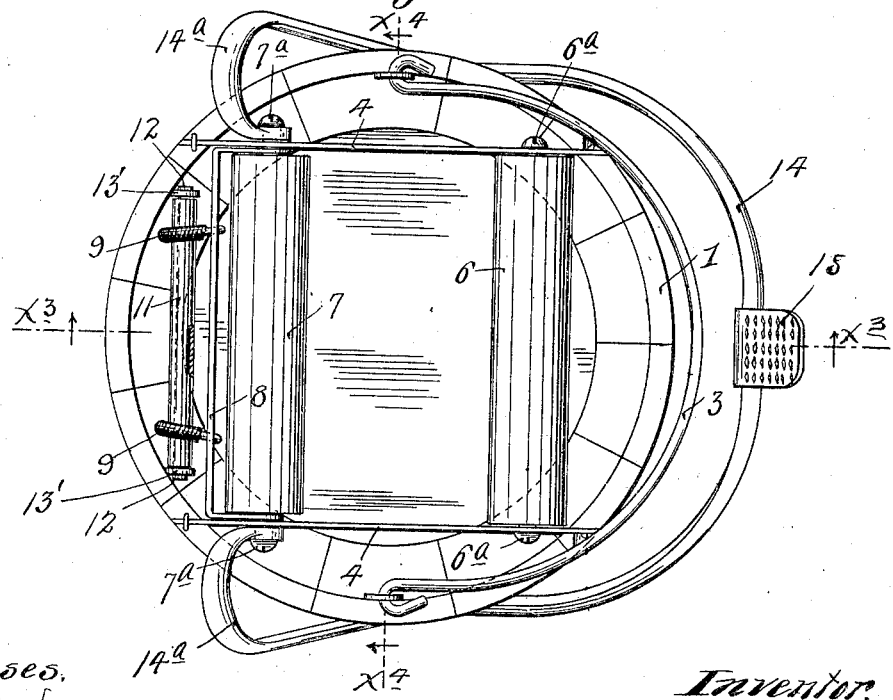

Figure 1 is a side elevation of a pail equipped with my improved wringer. Fig. 2 is a plan view of the same. Fig. 3 is a vertical section taken approximately on the line $x^3 x^3$ of Fig. 2. Fig. 4 is a vertical section taken approximately on the line $x^4 x^4$ of Fig. 2; and Fig. 5 is a detail in section on the line $x^5 x^5$ of Fig. 4, some parts being broken away.

The numeral 1 indicates an ordinary scrubbing-pail, shown as provided at one side and at its bottom with a foot-piece 2 and provided at its top with an ordinary bail 3. Suitably secured within the pail, near the top of the same, is a pair of parallel horizontally-extended guide-bars or tracks 4, having longitudinally-extended slots 5.

The numerals 6 and 7 indicate a pair of cooperating wringing-rollers, the former of which is journaled to the right-hand ends of the guide-bars 4 by means of screws $6^a$, which afford trunnions therefor. The other roller, 7, has trunnions $7^a$, afforded by screws which work loosely through and travel in the slots 5 of the said guide-bars or tracks 4.

The numeral 8 indicates a yoke, the ends of which are loosely pivoted on the trunnions $7^a$ between the ends of the rollers 7 and the bars 4. A long coiled spring 9 is secured at its ends to the yoke 8, as best shown in Figs. 2 and 3. The intermediate portion of this coiled spring 9 is drawn downward and secured to the left-hand side of the pail as viewed in Figs. 2 and 3 by means of a keeper 10. Both branches or legs of the spring 9 run over an idle guide roller or sleeve 11, shown as afforded by tubular sections mounted on the rod or shaft 12, secured at its ends to the side of the pail by means of lugs or ears 13'. This spring 9 of course normally yieldingly holds the roller 7 in its extreme position away from the roller 6, as shown in Figs. 1, 2, and 3.

Pivoted at 13 to the sides of the pail, near the bottom of the same and embracing the pail, is a foot-operated lever 14 in the form of a bell-crank bail. This so-called "bell-crank bail" is formed by a metal strap bent to form a yoke with vertical prongs which extend upward above the top of the pail, as indicated at $14^a$, and are then curved downward and inward and pivotally connected to the trunnions $7^a$ of the traveling roller 7. The bail and arm portions of the foot-lever 14 are braced by short tie-rods $14^b$. (Best shown in Fig. 1.) At its bowed or bail portion the foot-lever 14 is provided with a foot-piece 15.

The operation of the device is obvious, but may be briefly stated, as follows: The mop is of course dropped into the water contained in the pail between the rollers 6 and 7 while the said rollers are separated, as shown in the drawings. The person using the wringer then places one foot on the foot-piece 2, so as to hold the pail firmly, and then places the other foot on the foot-piece 15 of the foot-lever or so-called "bell-crank bail" 14, thereby pressing the same downward and forcing the wringing-roller 7 toward the wringing-roller 6. In this way the mop as it is drawn upward from between the two wringing-rollers may be squeezed under any desired pressure.

As is evident, the device above described is extremely simple in construction and efficient in operation. It is important to note that it has no projecting movable parts which are liable to catch or tear the garments of the operator.

It will of course be understood that the device described is capable of considerable modification within the scope of my invention as herein set forth and claimed.

What I claim, and desire to secure by Letters Patent of the United States, is as follows:

1. The combination with a pail having a relatively stationary wringing-roller and a guide-roller mounted interior thereof, of a foot-lever of bail-like form pivoted to the exterior of the pail and provided with arms forming bell-cranks, a traveling wringing-roller movable to and from an operative position by movements of said arms, and a spring acting on said traveling roller, passed over the said guide-roller and anchored at its lower portion within said pail, substantially as described.

2. The combination with the pail having the parallel slotted guides 4 secured within the same, of the wringing-rollers 6 journaled to said guides 4, the traveling wringing-roller 7 having trunnions working in the slots of said guides 4, the yoke 8 pivoted to the trunnions of said roller 7, the spring 9 connected to said yoke 8 and secured by the keeper 10, the guide-roller 11 over which said spring runs, and the foot-operated lever or bell-crank bail 14 pivoted to the pail at 13, provided with a foot-piece 15 and having its vertical arms bent inward and downward and loosely pivoted to the trunnions of said traveling wringing-roller 7, substantially as described.

In testimony whereof I affix my signature in presence of two witnesses.

JOHN ROSEBUSH.

Witnesses:
JAS. F. WILLIAMSON,
F. D. MERCHANT.